United States Patent
Peyghambarian et al.

(10) Patent No.: US 7,693,355 B2
(45) Date of Patent: Apr. 6, 2010

(54) HYBRID ELECTRO-OPTIC POLYMER/SOL-GEL MODULATOR

(75) Inventors: Nasser N. Peyghambarian, Tucson, AZ (US); Robert A. Norwood, Tucson, AZ (US); Yasufumi Enami, Tucson, AZ (US); Christopher T. DeRose, Tucson, AZ (US)

(73) Assignee: The Arizona Board of Regents on behalf of the University of Arizona, Tucson, AZ (US)

( * ) Notice: Subject to any disclaimer, the term of this patent is extended or adjusted under 35 U.S.C. 154(b) by 93 days.

(21) Appl. No.: 12/199,765

(22) Filed: Aug. 27, 2008

(65) Prior Publication Data

US 2009/0074346 A1    Mar. 19, 2009

Related U.S. Application Data

(60) Provisional application No. 60/967,679, filed on Sep. 6, 2007.

(51) Int. Cl.
*G02F 1/035*    (2006.01)
(52) U.S. Cl. ............... 385/2; 385/8; 385/43; 385/129
(58) Field of Classification Search ............. 385/1–3, 385/4, 8–9, 40, 43, 129–132
See application file for complete search history.

(56) References Cited

U.S. PATENT DOCUMENTS 7,391,938 B2    6/2008 Peyghambarian
2003/0169985 A1*   9/2003 Caron et al. ............... 385/123

2008/0290066 A1*  11/2008 Li et al. ..................... 216/39

OTHER PUBLICATIONS

Y. Enami et al, Hybrid electro-optic polymer and selectively buried sol-gel waveguides, Applied Physics Letters, vol. 82, No. 4, Jan. 27, 2003.

Y. Enami et al, Hybrid cross-linkable polymer/sol-gel waveguide modulators with 0.65 V half wave voltage at 1550 nm, Applied Physics Letters 91, (Aug. 28, 2007).

Y. Enami et al, Low half-wave voltage and high electro-optic effect in hybrid polymer/sol-gel waveguide modulators, Applied Physics Letters 89, (Oct. 3, 2006).

Y. Enami et al, Hybrid electro-optic polymer/sol-gel waveguide modulator fabricated by all-wet etching process, Applied Physics Letters vol. 83, No. 23 Dec. 8, 2003.

Y. Enami et al, Polarization-Insensitive Transition Between Sol-Gel Waveguide and Electrooptic Polymer and Intensity Modulation for All-Optical Networks, Journal of Lightwave Technology, vol. 21, No. 9, Sep. 2003.

Y. Enami et al, Hybrid polymer/sol-gel waveguide modulators with exceptionally large electro-optic coefficients, Nature Photonics, vol. 2, Mar. 1, 2007.

(Continued)

*Primary Examiner*—Hemang Sanghavi
(74) *Attorney, Agent, or Firm*—Eric A. Gifford (57) ABSTRACT

A hybrid EO polymer/sol-gel modulator in which the sol-gel core waveguide does not lie below the active EO polymer waveguide increases the higher electric field/optical field overlap factor Γ and reduces inter-electrode separation d thereby lowering the modulator's half-wave drive voltage Vπ, reducing insertion loss and improving extinction.

21 Claims, 8 Drawing Sheets

OTHER PUBLICATIONS

Christoper T. DeRose et al, Pockel's coefficient enhancement of poled electro-optic polymers with a hybrid organic-inorganic sol-gel cladding layer, Applied Physics Letters 89 (Sep. 25, 2006).

R. A. Norwood, Hybrid sol-gel electro-optic polymer modulators: Beating the drive voltage/loss tradeoff, Journal of Nonlinear Optical Physics & Materials vol. 16, #2 Aug. 15, 2007.

* cited by examiner

HYBRID ELECTRO-OPTIC POLYMER/SOL-GEL MODULATOR

CROSS-REFERENCE TO RELATED APPLICATIONS

This application claims benefit of priority under 35 U.S.C. 119(e) to U.S. Provisional Application No. 60/967,679 entitled "Hybrid Electro-Optic Polymer/Sol-Gel Modulators With Reduced Half-Wave Voltage, Lower Insertion Loss and Improved Contrast" and filed on Sep. 6, 2007, the entire contents of which are incorporated by reference.

GOVERNMENT LICENSE RIGHTS

This invention was made with government support under NR0000-07-C-0030 awarded by the Department of Defense and under DMR0120967 awarded by the National Science Foundation. The government has certain rights in the invention.

BACKGROUND OF THE INVENTION

1. Field of the Invention

This invention relates to electro-optic (EO) modulators and more particularly to hybrid EO polymer/sol-gel modulators in which the sol-gel core waveguide does not lie below the active EO polymer waveguide in the active region.

2. Description of the Related Art

An EO modulator is fundamentally a device that is able to impress an electrical signal on the amplitude or phase of an optical input through the use of special materials that exhibit an EO effect. In such materials, when an electric field is applied to the material, an associated change in refractive index occurs, which can be used to create various kinds of EO modulators, including phase, Mach-Zehnder modulators and directional coupler modulators. The change in refractive index is directly proportional to the applied electric field, so that this is sometimes called the linear EO effect, which only occurs in materials lacking a center of symmetry, as opposed to the much smaller quadratic EO effect which occurs in all materials. In most applications, the EO modulator is part of a fiber-optic communications system, in which case input and output fibers are aligned and attached to an optical waveguide that has been created in the EO material by a variety of methods. EO modulators are generally used when direct modulation of the laser in the communications system is not a viable option, which occurs when very high bandwidth (>10 GHz) or signal linearity are required. High bandwidth is needed in very high bit rate digital communications systems (OC-768 systems running at 40 Gbps), while both high bandwidth and high signal linearity are required for analog applications such as phased array antennas, optical digital to analog converters, and the like. The cw laser is typically a diode laser in the wavelength region from 800-1600 nm, predominantly near 1310 nm (O band) and near 1550 nm (C and L band).

The modulator is characterized by several critical parameters, the most important of which are as follows:

Half-wave voltage, $V_\pi$—the voltage change needed to take the modulator from its maximally transmitting state to its minimally transmitting state; it is generally desired that this voltage be as small as possible;

Insertion loss—the optical loss, in decibels, that is suffered by light as it travels from the input to the output of the modulator; it is always desired that the loss be as small as possible;

Extinction—the ratio of the output power in the "on" state to the output power in the "off" state; this ratio should be as large as possible and is generally measured in decibels; and 3 dB bandwidth—the electrical driving signal frequency at which the maximal optical output of the modulator, driven at the low frequency half-wave voltage, has dropped by 3 dB or 50%.

For a Mach-Zehnder waveguide EO modulator, the half-wave voltage is related to the various other parameters of interest via:

$$V_\pi = \frac{\lambda d}{n_{eff}^3 r_{max} \Gamma L},$$

where $\lambda$ is the optical wavelength, d is the physical separation distance between the drive electrodes in the direction along the applied field, $n_{eff}$ is the effective refractive index for light polarized along the direction in which the electric field is applied (generally a function of both waveguide materials properties and dimensions), $r_{max}$ is the maximum value of the EO coefficient (in units of picometers per volt) that can be achieved in the material, which dictates the preferred directions for the applied field and the light polarization, $\Gamma$ is the normalized dimensionless overlap integral that measures the degree to which the optical and electrical fields overlap, having a minimum value of 0 and a maximum value of 1 and L is the length of the active region of the modulator, defined as that region where an electric field is applied to an EO material waveguide.

A hybrid EO polymer/sol-gel modulator was first described in Enami, et. al. *Appl. Phys. Lett.* 82, 490 (2003) and most recently reviewed in Enami, et. al., *Nature Photonics* 1, 180 (2007) involves using organically modified sol-gels as the cladding and EO polymers as the waveguide in the active region of the modulator and using just sol-gels in the passive region of the modulator where coupling to the optical fiber occurs. These sol-gels have an easily adjustable refractive index, which makes it possible to make waveguides with low coupling loss to optical fiber. They also have been shown to allow for efficient in-device poling of the EO polymer as discussed in C. T. DeRose, et. al. *Appl. Phys. Lett.* 89, 131102 (2006) and U.S. Pat. No. 7,391,938.

Figure 1:
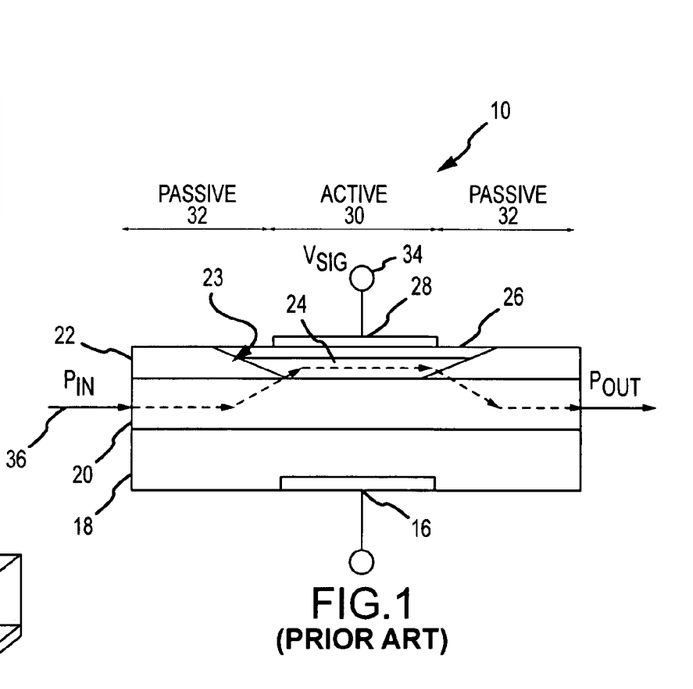
FIG. 1, as described above, is a section view of they hybrid EO polymer/sol-gel modulator.

As shown in FIG. 1, a hybrid EO polymer/sol-gel modulator 10 is formed on an insulating layer on a substrate (not shown). The modulator includes a bottom electrode 16, a sol-gel under cladding 18 having a refractive index $n_1$, a sol-gel core 20 having a refractive index $n_2 > n_1$, and a sol-gel over cladding 22 having a refractive index $n_1$. The sol-gel core 20 is confined below and on either side by under cladding 18. In order to provide a symmetric mode as the light propagates through the waveguide and to provide better coupling to the input and output fibers, the cladding indices $n_1$ are preferably the same. However, some slight variation (<<1%) may occur within a cladding or between cladding layers due to slight variations in fabrication or design.

Figure 2A:
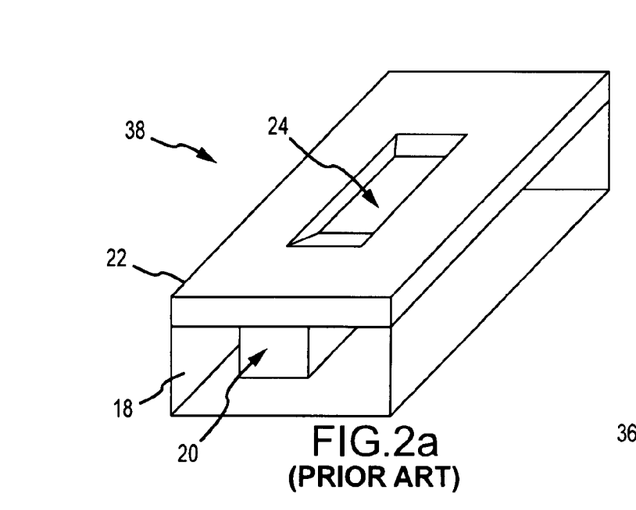
FIGS. 2a and 2b, as described above, are perspective views of a hybrid EO polymer/sol-gel modulator configured as a phase modulator and a Mach-Zehnder modulator, respectively.
Figure 2B:
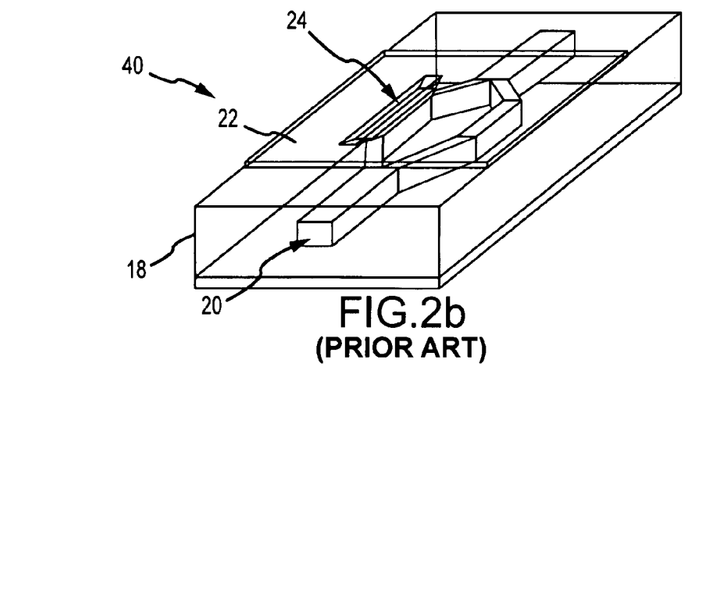

A vertical taper 23 in layer 22 exposes the surface of core 20 above electrode 16. An EO polymer waveguide 24 having a refractive index $n_3 > n_2$ covers the exposed surface of the sol-gel core layer. In typical embodiments, the refractive index $n_3$ is designed to be uniform over the active region. Small variations from the uniform value on account of fabrication and poling can occur without degrading performance. A non-uniform index profile may be designed to provide the same accumulated phase change. A buffer layer 26 having a refractive index $n_4 < n_2$, typically $< n_1$ and preferably $< n_1 - 0.1$ covers the EO polymer layer. A top electrode 28 defines an active region 30 between itself and bottom electrode 16 and passive regions 32 to either side. A voltage signal $V_{sig}$ 34 is applied between the top and bottom electrodes to apply an electric field along the poling direction of the EO polymer to change the refractive index of the EO polymer waveguide and modulate the amplitude or phase of light 36 passing through the modulator. Modulator 10 may be configured as a phase modulator 38 having one arm as shown in FIG. 2a or as a Mach-Zehnder modulator 40 having a pair of arms as shown in FIG. 2b and with the ability to produce on-chip amplitude modulation. The Mach-Zehnder can be driven using single-arm, dual-drive or push-pull techniques well known to those in the art.

Light 36 can be input to and output from the modulator using a standard single-mode optical fiber (SMF-28 from Corning); the dimensions of the input and output sol-gel waveguides (~4 µm×4 µm) and the refractive index difference (~1%) between the core and the cladding sol-gels can be optimized so that coupling loss to SMF-28 is minimized. Light 36 propagating in sol-gel core 20 proceeds and soon enters the region where the sol-gel over cladding 22 is physically tapered. As the light propagates further into this region it begins to "see" the EO polymer waveguide 24 that has been deposited in the recessed region over and between the physical sol-gel tapers on the input and output sides of the modulator. Since the EO polymer has a significantly higher refractive index (~1.6-1.7) than the sol-gel core (~1.5), the light from the sol-gel core is gradually or "adiabatically" pulled up into the EO polymer so that by the end of the taper as much light as possible has been transferred to the EO polymer. The same mechanism (in reverse) results in the transfer of light from the EO polymer back to the sol-gel core at the output. In the active region 30, the refractive index of the buffer layer 26 is often chosen to be very low (~1.3-1.4) which ensures that the optical waveguide mode in the EO polymer waveguide 24 drops off very rapidly as it enters the buffer layer thereby minimizing losses from the electrodes. In the case of a single-arm Mach-Zehnder modulator (FIG. 2b), when a field is applied to the electrodes and light is propagating in the modulator, light propagating in the left-hand arm of the Mach-Zehnder receives a phase shift relative to the light propagating the right-hand arm, so that the intensity at the output of the Mach-Zehnder changes.

In a representative embodiment sol-gel claddings 18 and 22 and core 20 are comprised of 95/5 (n=1.487) and 85/15 (n=1.50) mixtures (mole %) of methacryloyloxy propyltrimethoxysilane (MAPTMS) and zirconium-IV-n-propoxide, where the MAPTMS provides both organic and inorganic character as well as photopatternability, while the zirconium-IV-n-propoxide is used as an index modifier. The under cladding 18 is deposited by spin coating and hard baked (~8.5 µm), while the core 85/15 20 is also deposited by spin coating, but then is soft-baked and photopatterned, through a simple wet etching process, prior to hard baking (~4 µm). Under cladding, also 18, is deposited after the core is patterned to provide confinement on either side of the core. This photopatterned sol-gel waveguide provides excellent coupling to standard SMF-28 single-mode fiber, with coupling losses in the 0.5-1.0 dB per end face range routinely achieved. Propagation losses for this standard sol-gel are 3-4 dB/cm. An adiabatic vertical transition to an EO polymer waveguide (n~1.65) is accomplished through the use of a grey scale mask that creates a vertical taper in the next layer of sol-gel (i.e. sol-gel over cladding 22). Note that this is not an evanescent field device, as the vertical adiabatic transitions result in more than 70% of the optical field being in the EO polymer waveguide 24. The vertical tapers are also low loss, with less than 1 dB of radiation loss at each taper when the device is made to design. The EO polymer waveguide 24 is typically quite thin (~1 µm) to achieve single-mode operation; the sol-gel over cladding 22 provides lateral confinement. The buffer layer 26 consists of CYTOP® (Asahi Glass), which has a very low refractive index (n=1.33) at 1550 nm as well as extremely low optical absorption, thereby providing good optical isolation from the top drive electrode 28 even for thin layers (~1.5 µm).

SUMMARY OF THE INVENTION

The present invention provides hybrid EO polymer/sol-gel modulators with higher electric field/optical field overlap factor $\Gamma$ and smaller inter-electrode separation d to reduce the modulator's half-wave drive voltage $V_\pi$, reduce insertion loss and improve extinction. This is accomplished with modulator designs in which the sol-gel core waveguide does not lie below the EO polymer waveguide in the active region.

In a first index-tapered, core-tapered embodiment, the sol-gel over cladding has been eliminated and the vertical taper formed in the sol-gel core. Placing the EO polymer waveguide in the same plane as the sol-gel core eliminates the potential for deleterious coupling between the sol-gel core and the EO polymer waveguide. The EO polymer waveguide is physically extended to cover the vertical taper in the passive regions on either side of the active region. The index itself is tapered from a high uniform value in the active region to a lower value to approximately match the sol-gel core at the top of the taper. By tapering the EO polymer waveguide index the inter-electrode separation d is reduced and the electric field/optical field overlap factor $\Gamma$ is increased, both having the beneficial effect of reducing the half-wave drive voltage. The formation of the vertical taper in the sol-gel core and the index taper of the EO polymer waveguide are separable features.

In a second phantom-core embodiment, the sol-gel core lies in a plane below the plane of the EO polymer waveguide. The sol-gel core is patterned so that the core waveguide stops at or near the end of the vertical taper in the sol-gel over cladding. The gap that is created is filled with a sol-gel or other material with a refractive index less than or equal to that of the sol-gel under cladding. Since this region is no longer a waveguide, no light is coupled from the EO polymer waveguide to the core thereby increasing $\Gamma$ and reducing coupling to the bottom electrode. In fact, the bottom electrode may be placed on top of the sol-gel under cladding for reduced inter-electrode separation d. The lack of background light from the sol-gel core leads to significantly improved modulation efficiency as well.

In a third transverse-tapered embodiment, a sol-gel side-cladding lies in the same plane as the sol-gel core. The side-cladding has a transverse physical taper on one (phase modulator) or both (Mach-Zehnder modulator) sides of the sol-gel core that defines a gap on one or both sides of the core. The gap increases gradually from the core from both ends until reaching a fixed gap that is maintained over the active region of the modulator. The gap(s) between the sol-gel core and sol-gel side-cladding are filled with EO polymer to form an EO polymer waveguide. A buffer layer lies over the EO polymer. A top electrode and patterned bottom electrode define the active region there between. This transverse-taper design improves confinement in the EO polymer waveguide so that the inter-electrode spacing can be reduced and $\Gamma$ increased. The transverse physical taper can be formed using standard lithographic techniques. The performance can be improved by tapering the refractive index of the EO polymer waveguide to gradually increase from a value slightly above that of the sol-gel core to its ordinary high value in the active region of the EO modulator.

These and other features and advantages of the invention will be apparent to those skilled in the art from the following detailed description of preferred embodiments, taken together with the accompanying drawings, in which:

DETAILED DESCRIPTION OF THE INVENTION

The present invention describes hybrid EO polymer/sol-gel modulators with higher electric field/optical field overlap factor $\Gamma$ and smaller inter-electrode separation d to reduce the modulator's half-wave voltage $V_\pi$, reduce insertion loss and improve extinction. Applications for these new designs include but are not limited to high speed analog modulators for cable TV, phased array radars, photonic analog-to-digital converts, RF photonics, fiber optic gyroscopes and true time delay lines as well as digital modulators for optical communications networks ranging from long haul dense wavelength division multiplexing (DWDM) networks, to metropolitan area DWDM, to passive optical networks (PON) for optical access.

The conventional design of the hybrid EO polymer/sol-gel modulator as illustrated in FIG. 1 suffers from several limitations owing principally to the fact that the design employs a sol-gel core waveguide that lies directly below the active EO polymer waveguide this has the effect of allowing light to couple from the EO polymer waveguide to the sol-gel core in the active region of the device resulting in the following performance impairments:

Since the light in the sol-gel core is optically close to the bottom electrode, the bottom cladding must be made thick enough to assure that the light does not reach the electrode thereby causing high insertion loss; this extra thickness results in increased required electrode separation d, which increases the half-wave voltage; a typical separation required is 15 μm;

The residual light that is in the sol-gel core does not get modulated, leading to a lower extinction ratio—a typical extinction ratio achieved is 10 dB, whereas most commercial applications require 20 dB or higher; and The coupling of the light into the sol-gel core and the limitation of the tapering technique used in the prior art lead to a moderate value of $\Gamma$, typically ~0.7

The present invention provides three different designs that do not employ a sol-gel core waveguide that lies below the active EO polymer waveguide in the active region. All three of the new designs result in improvements in d, $\Gamma$, d/$\Gamma$ and $V_\pi$. At a minimum, d can be reduced to 10 μm from the baseline art value of 15 μm, resulting in at least a 33% reduction in $V_\pi$. $\Gamma$ can be improved to at least 0.8 from its baseline art value of 0.7, representing at least a 14% reduction in $V_\pi$. Therefore, the ratio d/$\Gamma$ is, at a minimum, reduced to 12.5 μm, compared to the prior art value of 21.5 μm. Thus, the $V_\pi$ is at a minimum reduced by 42% from its prior art value.

More particularly, in one or more of the different designs the electrode separation d is at a minimum reduced by 33% from 15 μm to 10 μm, preferably reduced to 8 μm (47% reduction) and at a maximum reduced to 6 μm (60%). The overlap integral $\Gamma$ is at a minimum increased to 0.8 from the prior art value of 0.7 (12.5%), typically increased to 0.85 (21%), and at a maximum increased to 0.95 (36%). The ratio d/$\Gamma$, which appears in the expression for the half-wave voltage, is, at a minimum, reduced to 12.5 cm, a 42% reduction from its prior art value of 21.5, typically reduced to 9.4 μm (56%), and at a maximum reduced to 6.3 μm (70.7% reduction). Although the half-wave voltage $V_\pi$ is dependent on other parameters, the improvements in d and $\Gamma$ should reduce $V_\pi$ to less than 1 V for many modulator designs.

Index-Tapered EO Polymer, Vertically-Tapered Sol-Gel Core Modulator

An index-tapered, core-tapered modulator eliminates the sol-gel over cladding and forms the vertical taper in the sol-gel core. Placing the EO polymer waveguide in the same plane as the sol-gel core eliminates the potential for coupling between the sol-gel core and the EO polymer waveguide. The EO polymer waveguide is physically extended to cover the vertical taper in the passive regions on either side of the active region. The index is tapered from the high uniform value in the active region to a lower value to approximately match the sol-gel core at the top of the taper in the passive regions. By tapering the EO polymer waveguide index the inter-electrode separation d is reduced and the overlap $\Gamma$ between the optical and electrical fields is increased, both having the beneficial effect of reducing the drive voltage $V_\pi$. The formation of the vertical taper in the sol-gel core and the index taper of the EO polymer waveguide are separable features.

Figure 3A:
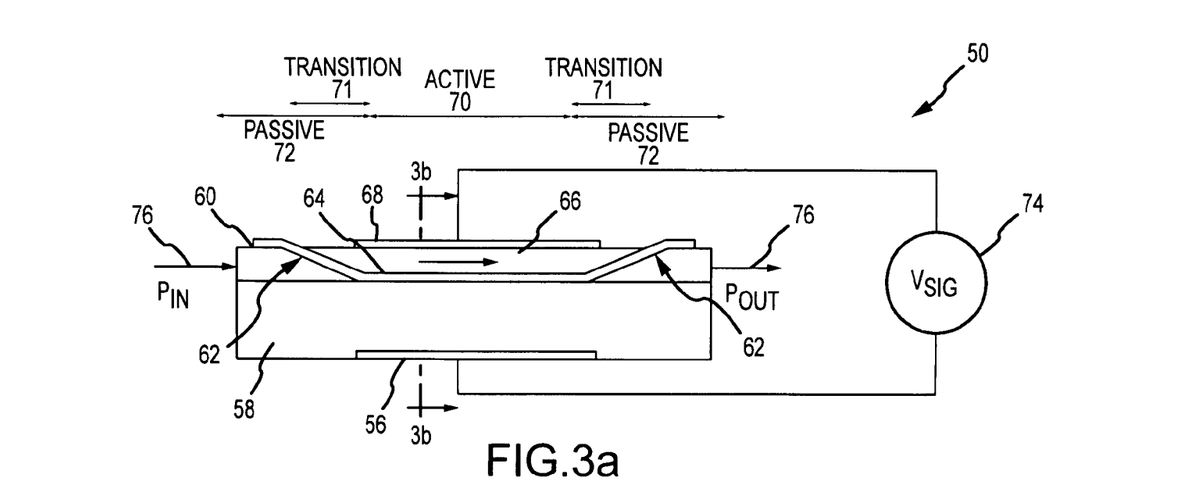
FIGS. 3a and 3b are section and end views of an embodiment of a hybrid tapered-core tapered-index Mach-Zehnder modulator in accordance with the present invention.
Figure 3B:
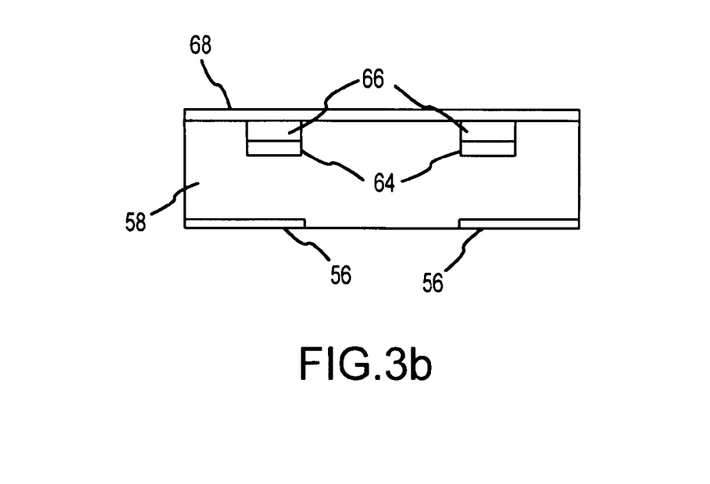
Figure 4:
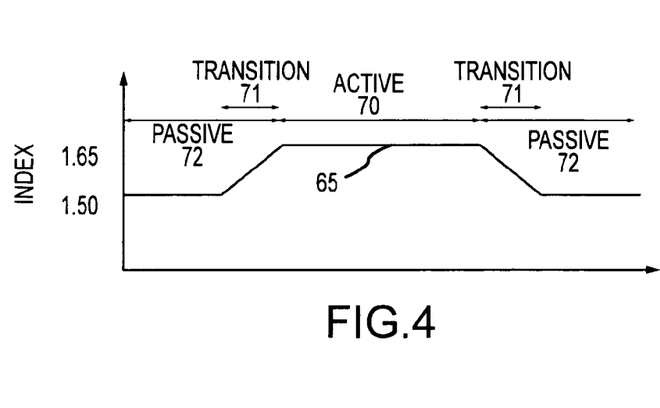
FIG. 4 is a plot of the tapered-index of the EO polymer waveguide.

As shown in FIGS. 3a and 3b, an embodiment of an index-tapered, core-tapered modulator 50 is formed on an insulating layer on a substrate (not shown). The modulator includes a bottom electrode 56, a sol-gel under cladding 58 having a refractive index $n_1$ and a sol-gel core 60 having a refractive index $n_2 > n_1$. Sol-gel under cladding 58 provides confinement below and on either side of sol-gel core 60. A vertical taper 62 in core 60 exposes the surface of under cladding 58 above electrode 56. An EO polymer waveguide 64 covers the vertical taper 62 in the passive regions and the exposed surface of under cladding 58 in the active region of the modulator. The EO polymer waveguide exhibits a refractive index 65 having a high value $n_3 > n_2$ in the active region 70 that tapers in a transition region 71 to a lower value $n_4 \approx n_2$ (e.g. within +/−2%) at the top of the physical taper in the passive region 72 as shown in FIG. 4. Note, the 'transition' regions 71 for the index taper are part of the passive regions 72. In typical embodiments, the refractive index $n_3$ is designed to be uniform over the active region. Small variations from the uniform value on account of fabrication and poling can occur without degrading performance. A non-uniform index profile may be designed to provide the same accumulated phase change.

A buffer layer 66 having a refractive index $n_5 < n_2$, typically $< n_1$ and preferably $< n_1 - 0.1$ covers the EO polymer waveguide. The index of the buffer layer is preferably considerably less than core index $n_2$. The EO polymer waveguide 64 is laterally confined by sol-gel under cladding 58 and vertically confined by buffer layer 66 and sol-gel under cladding 58 as shown in FIG. 3b. A top drive electrode 68 defines the active region 70 between itself and bottom electrode 56 and passive regions 72 to either side. An analog or digital voltage signal $V_{sig}$ 74 is applied between the top and bottom electrodes to change the refractive index of the EO polymer waveguide to modulate the amplitude or phase of light 76 passing through the modulator. Modulator 50 is configured as a Mach-Zehnder modulator but may be configured as a phase modulator.

In a representative embodiment of modulator 50 the sol-gel under cladding 58 and core 60 are comprised of 95/5 ($n_1 = 1.487$@1550 nm) and 85/15 ($n_2 = 1.50$@1550 nm) mixtures (mole %) of methacryloyloxy propyltrimethoxysilane (MAPTMS) and zirconium-IV-n-propoxide. The under cladding 58 is deposited by spin coating and hard baked (~8.5 μm), while the core 85/15 layer is also deposited by spin coating, but then is soft-baked and photopatterned to form core 60, through a simple wet etching process, prior to hard baking (~4 μm). Cladding, also 58, is deposited after the core and patterned to provide confinement on either side of the core. The preferred sol-gel material will have a high conductivity at poling temperatures to provide for efficient poling of the EO polymer, refractive indices $n_1$ and $n_2$ such that their difference $(n_2 - n_1)$ is approximately equal to that of standard single-mode optical fiber (~0.01), and low optical loss at 1550 nm and 1310 nm, preferably less than 1.0 dB/cm at both wavelengths. The EO polymer should exhibit a high EO coefficient $r_{33} > 30$ pm/V and preferably >60 pm/V. Unlike the known hybrid modulator design, the sol-gel core material lies outside the region of polymer poling, hence the sol-gel core does not have to be able to provide high poling efficiency. This removes a constraint, possibly allowing for a larger class of sol-gel materials to be used in each of the proposed designs. Furthermore, the proposed designs reduce inter-electrode spacing. To achieve the same performance, an EO polymer with a lower $r_{33}$ can be used with thinner devices. These materials may provide better stability and lower optical loss. A 6 μm thick thermally grown oxide $SiO_2$ layer beneath the sol-gel under cladding 58 is used to preserve optical transparency at 1550 nm wavelength and prevent coupling to the silicon substrate in the passive regions.

The EO polymer layer 64 is spin coated on the entire device and is typically quite thin (~1 μm) to achieve single-mode operation. The sol-gel core layer with a thickness of 4 μm has a refractive index difference of 0.86% from the sol-gel under cladding (5 μm) and side-cladding to increase the efficiency of the optical coupling to standard single mode fiber (SMF-28™), and is vertically tapered 62 to produce an adiabatic transition between the sol-gel core 60 and the EO polymer waveguide 64. To improve coupling, vertical taper 62 is preferably a long shallow taper e.g. 3.5 μm change in height over a 1 millimeter length or 0.0035 radians measured from the surface. An angle of taper less than 0.01 radians is suitable; less than 0.007 radians is typical and less than 0.005 radians being preferred. In an embodiment, the taper is at least 0.4 mm in length with an angle less than 0.01 radians.

An electrode is placed directly on the top of the EO polymer waveguide for poling and then removed. After poling, the modulator is irradiated with UV radiation (9 mW/cm$^2$) through a gray scale mask for 18 h to fabricate photobleached index tapers in the EO polymer waveguide 64 in the interface regions. The photobleached portion in the passive regions will become transparent, and the interface between the active and passive regions will evidence a gradual change from the original green to the colorless host polymer. The index of the photobleached EO polymer single film coated on $SiO_2$ was measured using the prism coupling method, and showed gradual index change from $n_3 = 1.65$ to $n_4 = 1.50$ after UV radiation. In a typical embodiment, $n_3$ is substantially uniform in the active region for a given device. The index value typically lies in a range from approximately 1.53 to approximately 1.80.

The buffer layer 66 is coated and the operating top electrode 68 is deposited. The electric field is applied between the electrodes along the poling direction to maximize the EO effect. The inter-electrode spacing is 15 μm or less. The buffer layer 66 consists of 2.0 μm-thick UV cured acrylate top buffer layer ($n_5 = 1.49$). The buffer layer can be any material with reasonably low optical loss at telecommunications wavelengths (<3 dB/cm) with an index that is less than $n_2$ and typically considerably less than the core index. The buffer layer principally serves to isolate light in the active EO polymer waveguide from the top electrode. In the event that the poling is performed directly on the EO polymer waveguide (and the electrode removed prior to the application of the buffer layer), the buffer layer must be a low temperature curing or drying material, so as to avoid depoling the EO polymer. If the poling is done after buffer layer deposition, the buffer layer should have conductivity higher than that of the EO polymer at the poling temperature in order to achieve efficient poling.

In the described embodiment, the EO polymer waveguide 64 is poled in the vertical direction. The electrodes 56 and 68 are placed to create an electric field along the poling direction for maximum effect. In an alternative embodiment, the EO polymer is poled in the horizontal direction and the electrodes are formed co-planar. This approach makes poling the EO polymer more difficult and may constrain the available addressing techniques but simplifies the microwave engineering of the modulator. Each of the index-tapered/core-tapered, phantom-core and transversely-tapered may be configured with either the vertical or co-planar electrodes, the general requirement being that the electrodes create an electric field along the poling direction of the EO polymer.

Figure 5A:
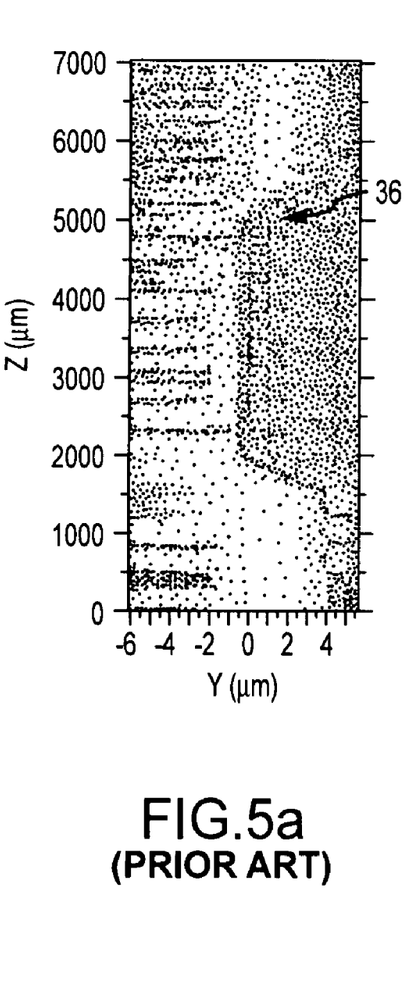
FIGS. 5a and 5b are diagrams illustrating mode propagation through the known and hybrid tapered-index, tapered-core Mach-Zehnder modulators, respectively.
Figure 5B:
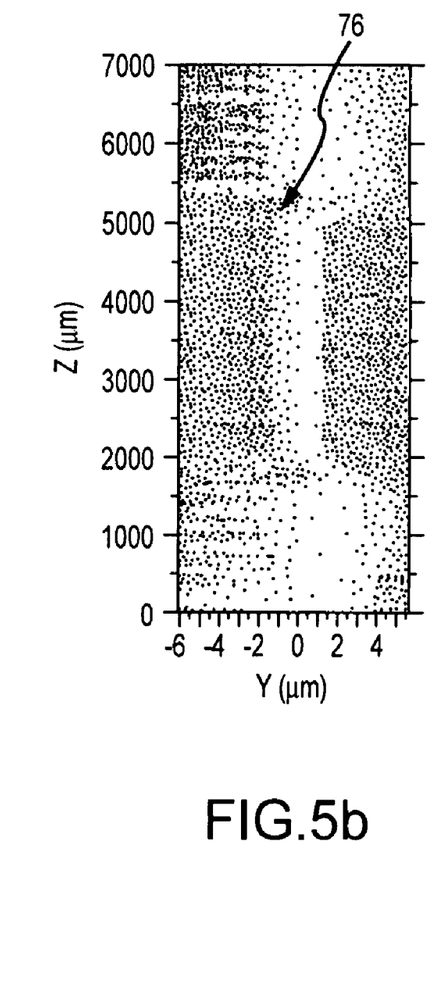

Compared to the known hybrid modulator design 10 shown in FIG. 1, modulator 50 exhibits improved mode confinement. The adiabatic transition is accomplished using a combination of a 0.5 mm-long sol-gel vertical taper 62 and a refractive index taper in the EO polymer waveguide 64, which reduce the transition loss and prevents mode beating between the sol-gel core and the EO polymer waveguide. Improved mode confinement in the EO polymer waveguide in the active region also reduces waveguiding loss due to optical absorption from under and over electrodes. As shown in FIG. 5a for the known modulator 10 and FIG. 5b for index-tapered core-tapered modulator 50, the confinement of light 36 and 76, respectively, propagating through the modulators is markedly different. In the figures, the optical power density is highest where the dot density is lowest, and falls off rapidly with increasing dot density. Light 36 spreads out through the modulator, with much of the light in the cladding. Light 76 is much better confined to the EO polymer waveguide. Consequently the inter-electrode separation distance d can be reduced and the overlap factor Γ is increased.

Figure 6:
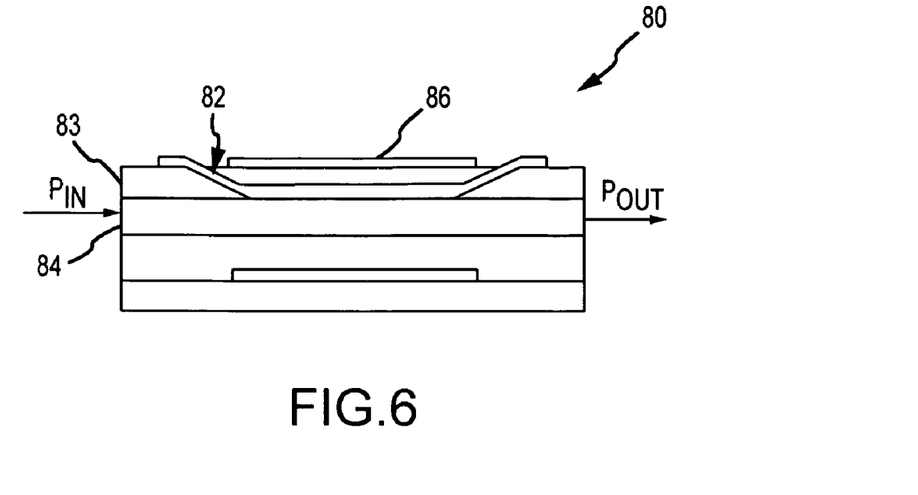
FIG. 6 is a section view of another embodiment of a hybrid tapered-index modulator.

In an alternate embodiment of the hybrid modulator 80 as shown in FIG. 6, a vertical taper 82 is formed in a sol-gel over cladding 83 having index $n_1$ above a sol-gel core 84. The over and under cladding indices $n_1$ are preferably the same. However, some slight variation (<<1%) may occur within a cladding or between claddings due to slight variations in fabrication or possibly design. For simplicity of description both claddings are designated as having index $n_1$ but slight variations in their values are well understood by those skilled in the art. An EO polymer waveguide 86 having a refractive index taper is formed over the vertical taper 82 and an exposed portion of the sol-gel core. The EO polymer waveguide index tapers to a value approximately equal to that of the over cladding. The other aspects of the modulator are the same.

Figure 7:
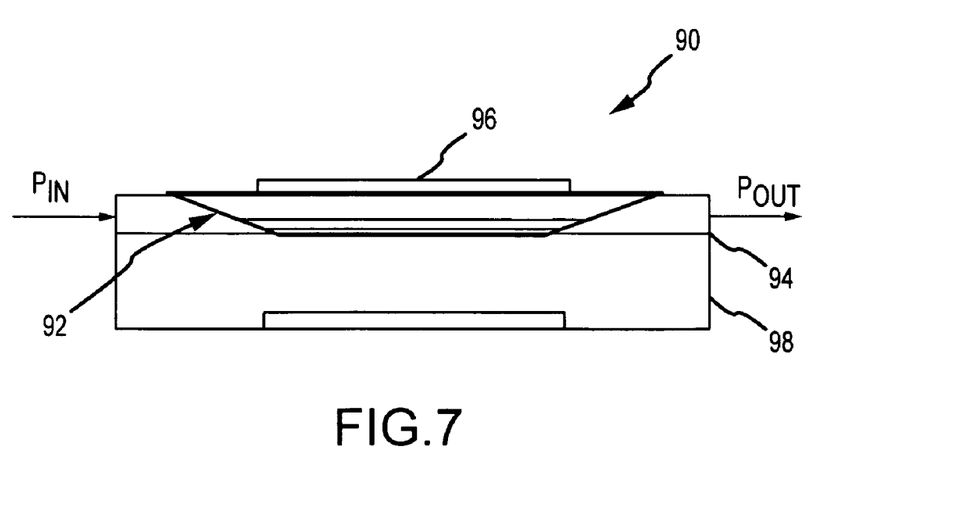
FIG. 7 is a section view of another embodiment of a hybrid tapered-core modulator.

In an alternate embodiment of the hybrid modulator 90 as shown in FIG. 7, a vertical taper 92 is formed in a sol-gel core 94. An EO polymer waveguide 96 having a uniform refractive index is formed inside the taper over an exposed portion of the sol-gel under cladding 98. The other aspects of the modulator are the same.

Phantom-Core Modulator

A phantom-core modulator includes a patterned sol-gel core that stops at or near the end of the vertical taper in the sol-gel over cladding. The gap that is created in the core is filled with a sol-gel or other material with a refractive index less than or equal to that of the sol-gel under cladding. Since this region is no longer a waveguide, no light is coupled from the EO polymer waveguide to the core. If the index difference between the phantom core and the EO polymer waveguide is large enough, the bottom electrode may be placed on top of the sol-gel under cladding for reduced inter-electrode separation. The lack of background light from the sol-gel core layer leads to significantly improved modulation efficiency.

Figure 8A:
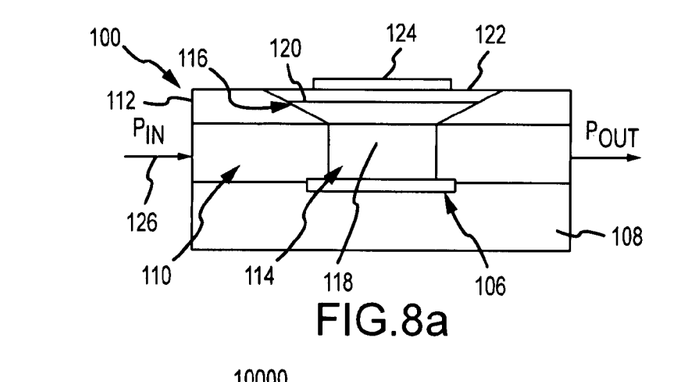
FIGS. 8a and 8b are section views of two embodiments of a hybrid phantom-core Mach-Zehnder modulator in accordance with the present invention.

As shown in FIG. 8a, a hybrid EO polymer/sol-gel modulator 100 is formed on an insulating layer of a substrate (not shown). The modulator includes a bottom electrode 106, a sol-gel under cladding 108 having a refractive index $n_1$, a sol-gel core 110 having a refractive index $n_2 > n_1$, and a sol-gel over cladding 112 having a refractive index $n_1$. The core 110 is confined below and to either side by under cladding 108. The over and under cladding indices $n_1$ are preferably the same. However, some slight variation (<<1%) may occur within a cladding or between claddings due to slight variations in fabrication or possibly design. For purposes of description both claddings are designated as having index $n_1$ but slight variations in their values are well understood by those skilled in the art.

The sol-gel core is patterned to form a gap 114 that exposes the surface of the under cladding 108 so that the core stops at or near the end of a vertical taper 116 in over cladding 112. Gap 114 is filled with a sol-gel or other material 118 with a refractive index $n_3 <= n_1$, preferably at least 0.10 less than and most preferably at least 0.15 less than. The material should exhibit low optical loss and reasonably high conductivity at typical poling temperatures. The taper exposes the surface of material 118 above electrode 106. An EO polymer waveguide 120 having a refractive index $n_4 > n_2$ covers the exposed surface of material 118. In typical embodiments, the refractive index $n_3$ is designed to be uniform over the active region. Small variations from the uniform value on account of fabrication and poling can occur without degrading performance. A non-uniform index profile may be designed to provide the same accumulated phase change.

Figure 8B:
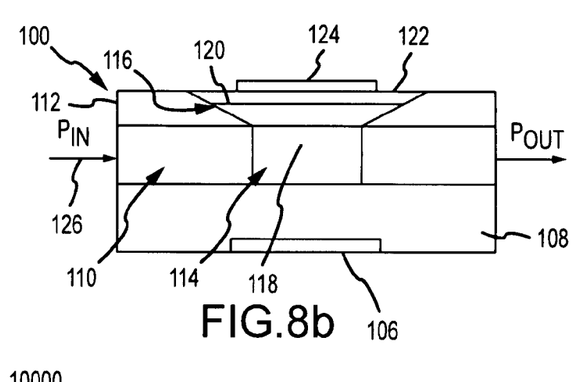

A buffer layer 122 having a refractive index $n_5 < n_2$, typically $< n_1$ and preferably $< n_1 - 0.1$ covers the EO polymer waveguide. A top drive electrode 124 defines an active region between itself and bottom electrode 106 and passive regions to either side. An analog or digital voltage signal is applied between the top and bottom electrodes to change the refractive index of the EO polymer waveguide to modulate the amplitude or phase of light 126 passing through the modulator. Modulator 100 may be configured as a phase modulator or as a Mach-Zehnder modulator. If the index of material 118 is not at least 0.10 less than the index of the under cladding 108, bottom electrode 106 should be placed beneath the under cladding 108 to avoid mode coupling to the bottom electrode as shown in FIG. 8b. Alternatively, the electrodes 106 and 124 can be co-planar and the EO polymer 120 poled along a horizontal direction. In another embodiment, the EO polymer can be index tapered in the physical taper region and over the passive sol-gel upper cladding so as to have the refractive index approximately match that of the sol-gel in the passive region, while gradually increasing in the physical taper region.

Figure 9A:
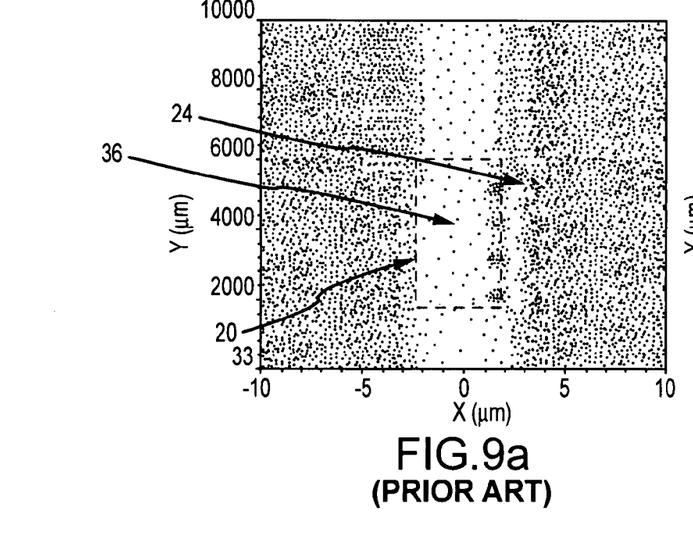
FIGS. 9a and 9b are diagrams illustrating mode coupling through the known and phantom-core modulators, respectively.
Figure 9B:
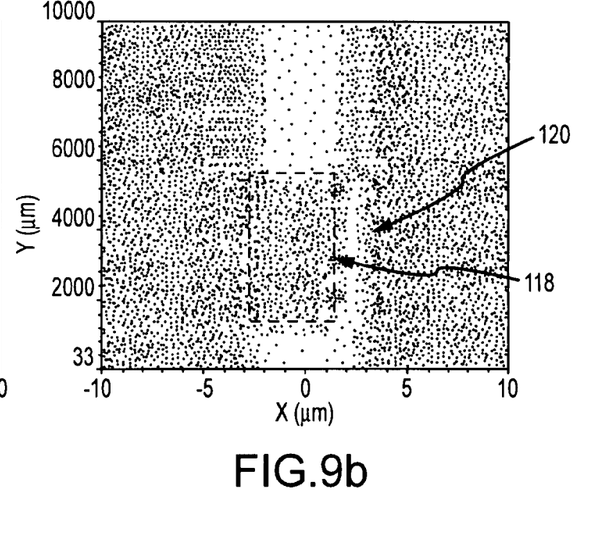
Figure 10A:
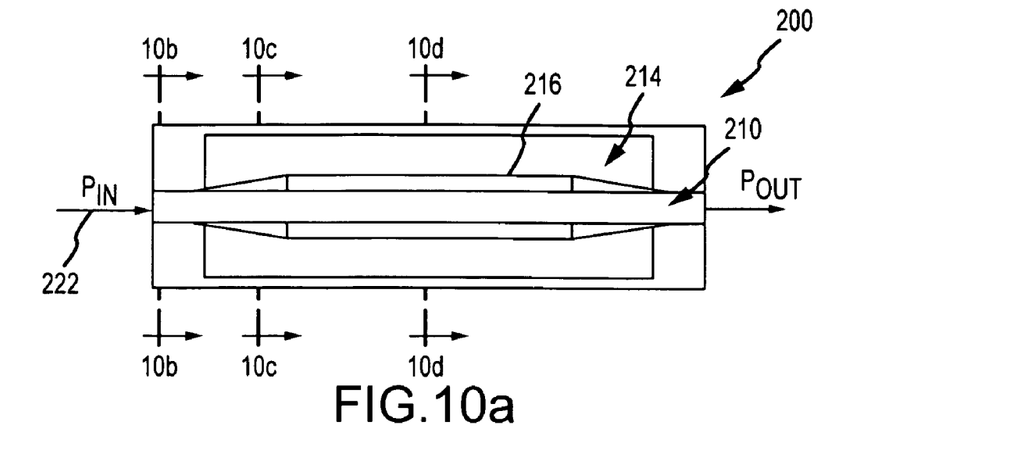
FIGS. 10a through 10d are plan and section views in the passive, transition and active regions of another embodiment of a hybrid transversely-tapered modulator.
Figure 10B:
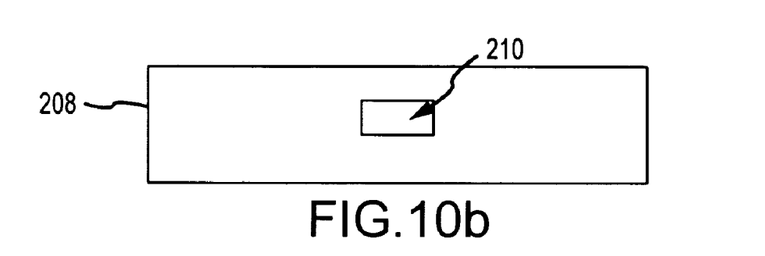
Figure 10C:
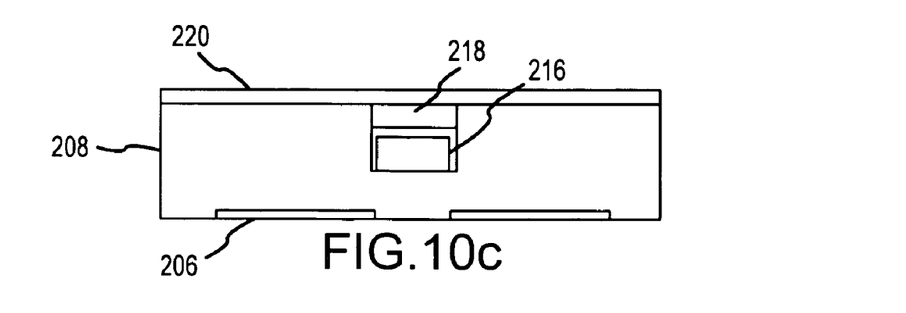
Figure 10D:
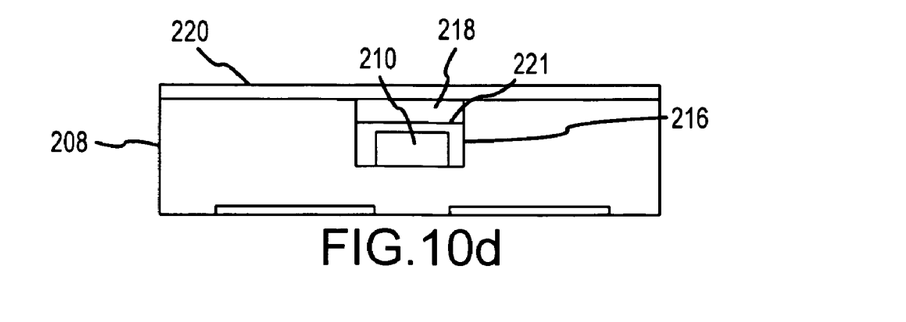

As shown in FIG. 9a, the known hybrid modulator design shown in FIG. 1 permits directional coupling of light 36 between the EO polymer waveguide 24 and the sol-gel core 20. Light remaining in the sol-gel core leads to increased insertion loss and low contrast. As shown in FIG. 9b, the phantom core design eliminates this possibility; no light is coupled between EO polymer waveguide 120 and material 118 and provides for reduced inter-electrode distance.

Transversely-Tapered Modulator

The vertical coupling approach exemplified by the known hybrid modulator of FIG. 1 and the improved index-tapered/core-tapered and phantom-core designs demands excellent control over film thicknesses in all regions of the device, which can be both difficult and costly. A horizontally (transversely) coupled device in which the sol-gel core waveguide does not lie below the active EO polymer waveguide has fewer issues with respect to dimensional control, relying primarily upon lithographically defined features whose resolution is well beyond the requirements of the modulator.

A transversely-tapered modulator includes a sol-gel side-cladding that lies in the same plane as the sol-gel core. The side-cladding has a transverse physical taper on one (phase modulator embodiment) or both (Mach-Zehnder modulator embodiment) sides of the sol-gel core that defines a transverse gap on one or both sides of the core. The gap increases gradually from the core from both ends until reaching a fixed gap that is maintained over the active region of the modulator. The gap(s) between the sol-gel core and sol-gel side-cladding are filled with EO polymer to form an EO polymer waveguide (s). A buffer layer lies over the EO polymer. A top electrode and patterned bottom electrode define the active region there between. This transverse-taper design improves confinement in the EO polymer waveguide so that the inter-electrode spacing can be reduced. The transverse physical taper can be formed using standard lithographic techniques. The performance can be improved by tapering the refractive index of the EO polymer waveguide to gradually increase from a value slightly above that of the sol-gel core to its ordinary high value in the active region of the EO modulator.

As shown in FIGS. 10a through 10d a transversely-tapered modulator 200 is formed on an insulating layer of a substrate (not shown). The modulator includes a patterned bottom electrode 206, a sol-gel under cladding 208 having a refractive index $n_1$ and a sol-gel core 210 having a refractive index $n_2 > n_1$. A sol-gel side-cladding 212 having a refractive index $n_1$ lies in the same plane as sol-gel core 210. The under and side cladding indices $n_1$ are preferably the same. However, some slight variation (<<1%) may occur within a cladding or between claddings due to slight variations in fabrication or possibly design. For purposes of description both claddings are designated as having index $n_1$ but slight variations in their values are well understood by those skilled in the art.

The side-cladding has a transverse physical taper 214 on one (phase modulator embodiment) or both (Mach-Zehnder modulator embodiment) sides of the sol-gel core that defines a transverse gap on one or both sides of the core. The gap increases gradually from the core from both ends over lengths $L_{taper1}$ and $L_{taper2}$, respectively, until reaching a fixed gap that is maintained over the active region $L_{active}$ of the modulator. The gap(s) between the sol-gel core and sol-gel side-cladding are filled with EO polymer having refractive index $n_3 > n_2$ to form an EO polymer waveguide(s) 216. In typical embodiments, the refractive index $n_3$ is designed to be uniform over the active region. Small variations from the uniform value on account of fabrication and poling can occur without degrading performance. A non-uniform index profile may be designed to provide the same accumulated phase change. Performance can be improved by tapering the refractive index from value $n_3$ over $L_{active}$ over lengths $L_{taper1}$ and $L_{taper2}$ in the passive regions to a value $n_5$ to approximately match index $n_2$ of the sol-gel core similar to what is depicted in FIG. 4.

A buffer layer 218 having a refractive index $n_4 < n_2$, typically $< n_1$ and preferably $< n_1 - 0.1$ lies over the EO polymer. A top electrode 220 and patterned bottom electrode 206 define the active region there between. As shown in this embodiment, a very thin layer of EO polymer 221 lies between core 210 and buffer layer 218. This is a residual of the standard spin-on processing of the EO polymer and is optically insignificant. This layer is not poled or modulated by the electric fields created by the electrodes to either side. The residual layer could be removed using dry-etch techniques such as reactive ion etching (RIE), but is unnecessary.

The input and output regions of the transverse-tapered modulator are similar to those of the vertically-tapered modulator. Sol-gel core 210 and cladding 208 create a single-mode optical waveguide with excellent coupling to optical fiber. Light 222 coupled into the modulator from an input SMF is initially confined to travel in sol-gel core 210 and gradually couples transversely into EO polymer waveguide(s) 216 in which the light is modulated in accordance with changes in the refractive index of the EO polymer induced by the applied electric field. The modulated light 222 is coupled back into core 210 and coupled to the output SMF. The Mach-Zehnder waveguide modulator does not require Y-branches, light 222 traveling in the core splits in two with half traveling down each EO polymer waveguide 216. The transverse design improves confinement of light in the EO polymer waveguide in the active region, which means the inter-electrode separation can be reduced without deleterious optical coupling to either electrode. This in turn means that the $V_\pi$ can be reduced.

Figure 11A:
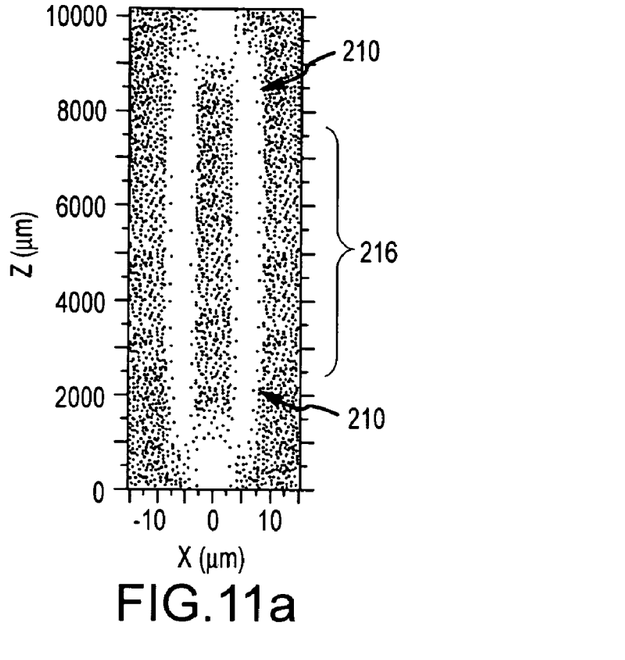
FIGS. 11a through 11c are plots of the optical power distribution for the mode propagation in the transversely-tapered modulator.
Figure 11B:
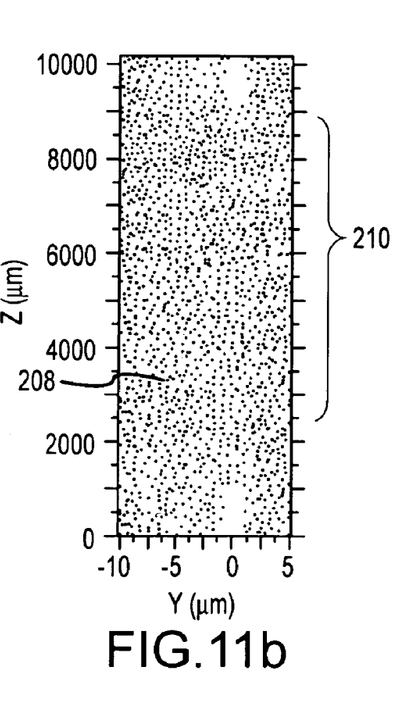
Figure 11C:
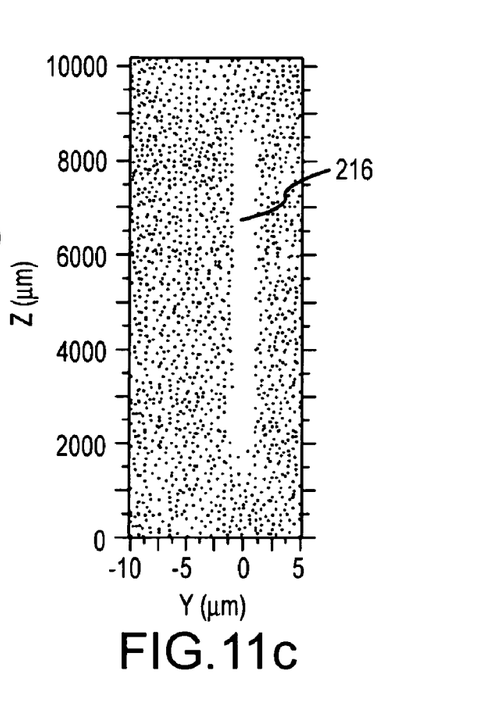

Optical power distribution for the mode propagation calculated using the 3D beam propagation method (BPM) is illustrated in FIGS. 11a-11c with the X, Y, and Z axes correspond to transverse, vertical, and propagation directions. The top view shown in FIG. 11a illustrates the integrated mode power for the total waveguide, the EO polymer core, and the sol-gel core layers. Light is confined to the sol-gel core 210 in the passive regions and the EO polymer waveguide 216 in the active regions. The side view shown in FIG. 11b illustrates the center region of the sol-gel straight core 210, demonstrating that no light is in the sol-gel core in the active region. The side view shown in FIG. 11c illustrates the center of an EO polymer MZ waveguide arm 216 (both are identical). The negative regions on the Y axis in FIG. 11b refer to positions in the under cladding 208.

Strong mode confinement (>90%) was calculated for the EO polymer core significantly exceeding that of previous hybrid modulators. The transverse transition loss was calculated to be <0.2 dB. This reduces d and increases Γ.

As shown in FIGS. 12a-12e and 13a-13e, a transverse-taper modulator 250 can be fabricated using standard photolithographic masking and high precision lithography. This is simpler, less expensive and more precise than the grey-scale masking techniques required to form the vertical taper. A fabrication sequence for a particular embodiment of the modulator is now described.

Figure 12A:
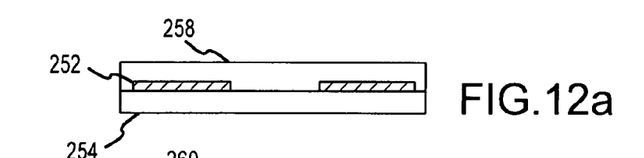
FIGS. 12a through 12e and 13a through 13e are a section in the action region and plan views of a sequence for fabricating the transversely-tapered modulator.
Figure 12B:
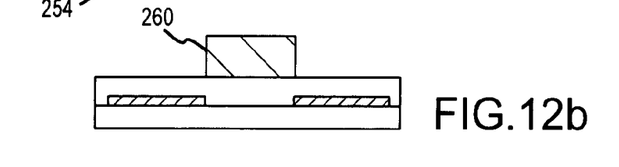
Figure 12C:
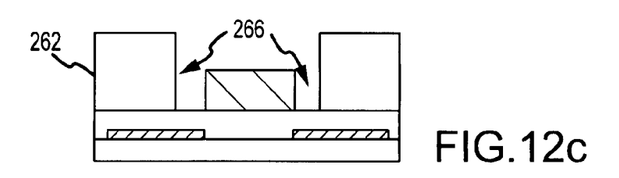
Figure 12D:
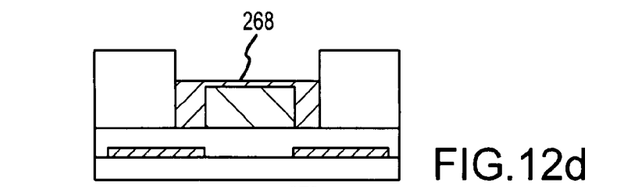
Figure 12E:
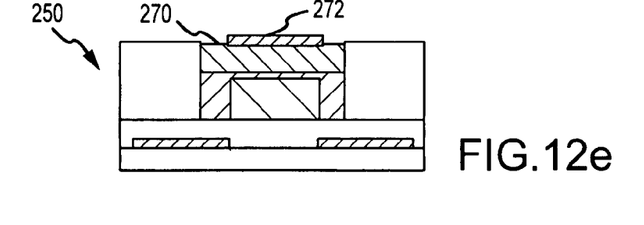
Figure 13A:
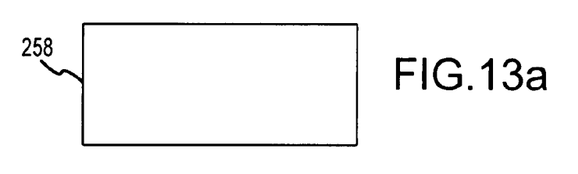
Figure 13B:
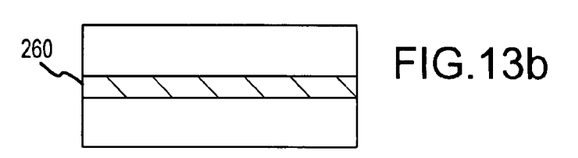
Figure 13C:
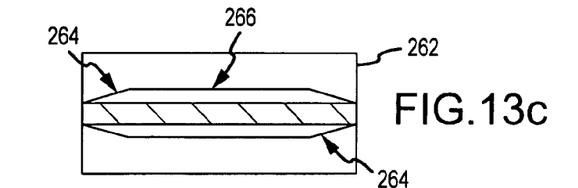
Figures 13D, 13E:
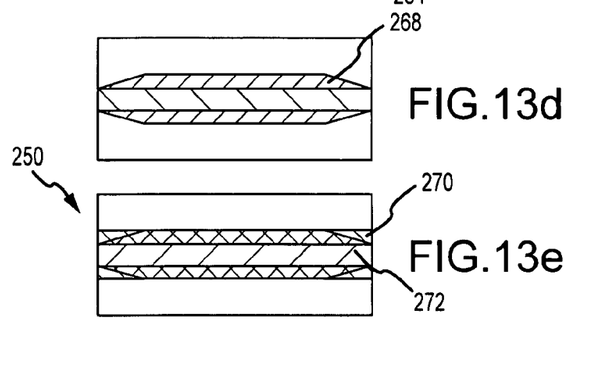

A multilayer bottom electrode 252 of Cr(10 nm)/Au(100 nm)/Cr(10 nm) is electron beam evaporated onto an Si<100> substrate 254 with a 6-μm-thick thermally grown $SiO_2$ layer (not shown). A lift-off technique is used to pattern the bottom electrode for dual-drive modulation. An under cladding 258 3 to 3.7 μm thick of methacryloyloxy propyltrimethoxysilane (MAPTMS) doped with an index modifier, zirconium (IV)-n-propoxide (ZrPO) having a mole ratio of MAPTMS to ZrPO of 95/5% is spin-coated over the substrate. UV radiation ($\lambda_{peak}$=365 nm, 9 mW/cm$^2$) accelerates the formation of the silica network in the sol-gel layers via the photoinitiator Irgacure 184 (CIBA). The cladding layers are UV-radiated through a photolithographic mask and wet-etched in isopropanol for photopatterning.

After coating and baking (150° C./1 h) of the sol-gel under cladding 258 a 3.5-μm-thick core layer was coated and wet-etched to give an 8-μm-wide straight channel core 260. The core layer is formed from the same material as the cladding but with a mole ratio of 85/15%.

A 7-μm-thick side cladding layer is coated and wet-etched to provide a side-cladding 262 and trenches 264 for the tapers and trenches 266 the 4-μm-wide MZ EO polymer channel waveguide. To maximize the coupling efficiency of the hybrid waveguide with SMF-28™, the top cladding covering the core 260 in the passive regions was coated and wet-etched to deposit the top cladding only in the passive region, and finally baked at 150° C. for 1 h.

A 2.8-μm-thick-EO polymer layer 268 is deposited by spin coating from a cyclopentanone solution to fill the trenches 264 and 266 adjacent to the sol-gel core 260 on the sol-gel under cladding 258. The guest-host EO polymer (25 wt % chromophore loaded AJLS102 in amorphous polycarbonate) was used as it readily photobleaches, has relatively low optical loss, and a good EO coefficient (~50 pm/V). After baking at 85° C. in a vacuum oven overnight, the EO polymer was photobleached using UV radiation through a gray-scale mask for 18 h. The EO polymer was partially bleached with a gradual index change in 0.5-mm-long transition regions, and totally bleached (n=1.53) in the other passive regions. After the EO polymer was contact-poled (poling voltage of 300-400V at 150° C.) between the bottom electrode and a poling electrode directly deposited onto the EO polymer, the poling electrode was removed using a solution of iodine and potassium iodide for subsequent coating of a low index (~1.33@1550 nm) top buffer layer. A 1.8-μm-thick CYTOP (Asahi Glass) top buffer layer 270 is formed over the EO polymer waveguide 268 and gold is sputtered to form a top electrode 272. The refractive indices at 1550 nm for the sol-gel core, the cladding, the EO polymer, and buffer layer were 1.500, 1.487, 1.632, and 1.328, respectively.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An electro-optic (EO) polymer/sol-gel modulator, comprising:
    a substrate;
    an insulating layer;
    a sol-gel under cladding having a refractive index $n_1$;
    a sol-gel core having a refractive index $n_2 > n_1$ confined below and on either side by said under cladding, said core having a vertical taper that exposes the surface of said under cladding in an active region;
    an EO polymer waveguide that covers the vertical taper in the sol-gel core and the exposed surface of the sol-gel under cladding, said EO polymer waveguide having a refractive index $n_3 > n_2$ in the active region that decreases along the vertical taper to a refractive index $n_4 \approx n_2$, said EO polymer waveguide poled along a direction;
    a buffer layer having a refractive index $n_5 < n_2$ over the EO polymer waveguide within the vertical taper; and
    first and second electrodes on opposite sides of the EO polymer waveguide in the active region, said electrodes configured to receive a voltage signal to apply an electric field along the poling direction to change the refractive index of the EO polymer waveguide in the active region.

2. The modulator of claim 1, wherein the vertical taper has a length of at least 0.4 mm and an angle of at most 0.01 radians.

3. The modulator of claim 1, wherein the refractive index $n_3$ has a substantially uniform value in the active region, said uniform value between 1.53 and 1.80 inclusive, said refractive index decreasing along the vertical taper to an $n_4$ value within +/−2% of 1.5.

4. The modulator of claim 1, wherein the EO polymer waveguide is poled along a direction approximately perpendicular to the substrate, said first and second electrodes beneath the under cladding and above the buffer layer respectively.

5. The modulator of claim 1, wherein an inter-electrode spacing d between the first and second electrodes is no more than 10 microns.

6. The modulator of claim 1, wherein an overlap integral Γ is at least 0.8.

7. An electro-optic (EO) polymer/sol-gel modulator, comprising:
    a substrate;
    an insulating layer;
    a sol-gel under cladding having a refractive index $n_1$;
    a sol-gel core having a refractive index $n_2 > n_1$, said core confined below and on either side by said under cladding;
    a sol-gel over cladding having a refractive index $n_1$ with a vertical taper that exposes the surface of said core in an active region
    an EO polymer waveguide that covers the vertical taper in the sol-gel over cladding and the exposed surface of the sol-gel core, said EO polymer waveguide having a refractive index $n_3 > n_2$ in the active region that decreases along the vertical taper to a refractive index $n_4 \approx n_1$;
    a buffer layer having a refractive index $n_5 < n_2$ over the EO polymer waveguide within the vertical taper; and
    first and second electrodes on opposite sides of the EO polymer waveguide in the active region, said electrodes configured to receive a voltage signal to apply an electric field along the poling direction to change the refractive index of the EO polymer waveguide in the active region.

8. The modulator of claim 7, wherein the refractive index $n_3$ has a uniform value in the active region between 1.53 and 1.80 inclusive and taper to $n_4$ value within +/−2% of 1.5.

9. An electro-optic (EO) polymer/sol-gel modulator, comprising:
    a substrate;
    an insulating layer;
    a sol-gel under cladding having a refractive index $n_1$;
    a sol-gel core having a refractive index $n_2 > n_1$ confined below and on either side by said under cladding, said core having a vertical taper that exposes the surface of said under cladding in active region;
    an EO polymer waveguide over the exposed surface of the sol-gel under cladding, said EO polymer layer having a refractive index $n_3 > n_2$ in the active region above the first electrode;
    a buffer layer having a refractive index $n_4 < n_2$ over the EO polymer waveguide within the vertical taper; and
    first and second electrodes on opposite sides of the EO polymer waveguide in the active region, said electrodes configured to receive a voltage signal to apply an electric field along the poling direction to change the refractive index of the EO polymer waveguide in the active region.

10. An electro-optic (EO) polymer/sol-gel modulator, comprising:
    a substrate;
    an insulating layer;
    a sol-gel under cladding having a refractive index $n_1$;
    a sol-gel core having a refractive index $n_2 > n_1$ confined below and on either side by said under cladding, said core having a gap therein in an active region;
    a material having refractive index $n_3 \leq n_1$ in said gap;
    a sol-gel over cladding having refractive index $n_1$ with a vertical taper that exposes the surface of the material in the active region;
    an EO polymer waveguide having a refractive index $n_4 > n_2$ over the exposed surface of the material in the active region;
    a buffer layer having a refractive index $n_5 < n_2$ over the EO polymer waveguide within the vertical taper; and
    first and second electrodes on opposite sides of the EO polymer waveguide in the active region, said electrodes configured to receive a voltage signal to apply an electric field along the poling direction to change the refractive index of the EO polymer waveguide in the active region.

11. The modulator of claim 10, wherein the EO polymer waveguide is poled along a direction approximately perpendicular to the substrate, said first and second electrodes on the under cladding and above the buffer layer respectively.

12. The modulator of claim 11, wherein $n_3 \leq n_1 - 0.10$, said first electrode is between the under cladding and the material.

13. The modulator of claim 10, wherein an inter-electrode spacing d between the first and second electrodes is no more than 10 microns.

14. The modulator of claim 1, wherein an overlap integral $\Gamma$ is at least 0.8.

15. An electro-optic (EO) polymer/sol-gel modulator, comprising:
   a substrate;
   an insulating layer;
   a sol-gel under cladding having a refractive index $n_1$;
   a sol-gel core on said under cladding having a refractive index $n_2 > n_1$;
   a sol-gel side-cladding having refractive index $n_1$ in the same plane as the sol-gel core, said side-cladding having a gap that executes a transverse physical taper away from the sol-gel core on one or both sides, maintains a fixed spacing from the sol-gel core in an active region and then executes a transverse physical taper back to the sol-gel core;
   EO polymer with refractive index $n_3 > n_2$ in said gaps between the sol-gel core and the sol-gel side-cladding defining an EO polymer waveguide on one or both sides including first and second transverse tapered waveguides and a transverse uniform waveguide in the active region;
   a buffer layer having a refractive index $n_4 < n_2$ over the EO polymer; and
   first and second electrodes on opposite sides of the EO polymer waveguide in the active region, said electrodes configured to receive a voltage signal to apply an electric field along the poling direction to change the refractive index of the EO polymer waveguide in the active region.

16. The modulator of claim 15, wherein the transverse taper has a length of at least 0.4 mm and an angle of at most 0.01 radians.

17. The modulator of claim 15, wherein the EO polymer waveguide has index $n_3 > n_2$ in the transverse uniform waveguide in the active region that decreases along the transverse tapered waveguides to a refractive index $n_5$ $n_2$.

18. The modulator of claim 17, wherein the refractive index $n_3$ has a uniform value in the active region between 1.53 and 1.80 inclusive and tapers to $n_5$ value within +/−2% of 1.5.

19. The modulator of claim 15, wherein the EO polymer waveguide is poled along a direction approximately perpendicular to the substrate, said first and second electrodes beneath the under cladding and above the buffer layer respectively.

20. The modulator of claim 15, wherein an inter-electrode spacing d between the first and second electrodes is no more than 10 microns.

21. The modulator of claim 15, wherein an overlap integral $\Gamma$ is at least 0.8.

* * * * *